UNITED STATES PATENT OFFICE.

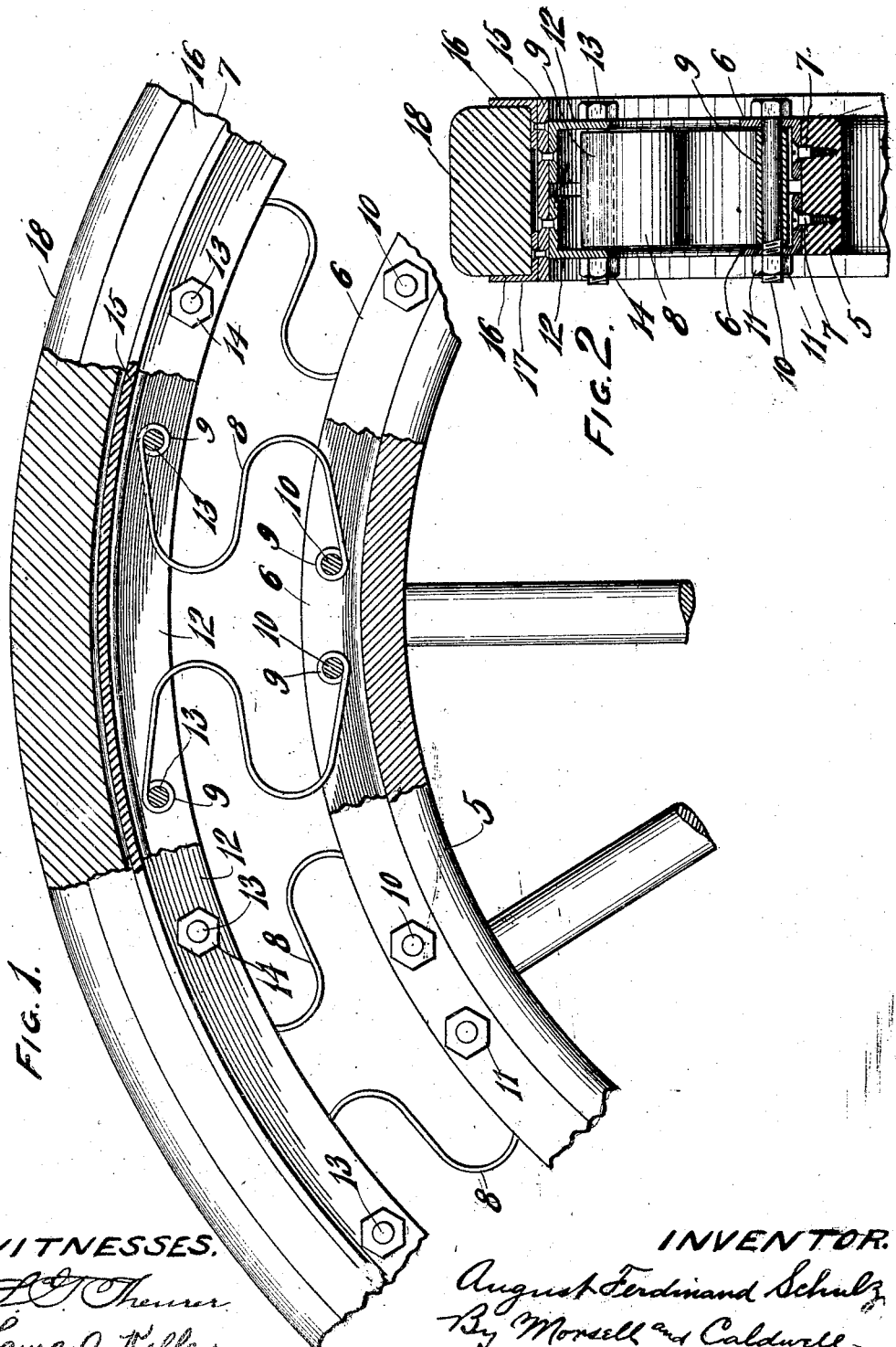

AUGUST FERDINAND SCHULZ, OF MILWAUKEE, WISCONSIN.

VEHICLE-WHEEL.

1,027,507.

Specification of Letters Patent.

Patented May 28, 1912.

Application filed March 17, 1911. Serial No. 614,982.

*To all whom it may concern:*

Be it known that I, AUGUST FERDINAND SCHULZ, a citizen of the United States, residing in Milwaukee, in the county of Milwaukee and State of Wisconsin, have invented new and useful Improvements in Vehicle-Wheels, of which the following is a description, reference being had to the accompanying drawings, which are a part of this specification.

This invention relates to improvements in vehicle wheels and more particularly to wheels for use with automobiles and other vehicles which require means for absorbing or eliminating the shocks due to riding over rough and uneven roads.

It is one of the objects of this invention to provide a vehicle wheel which possesses all of the resiliency and other desirable features of a wheel having a pneumatic tire and to eliminate all of the undesirable features.

A further object of the invention is to provide a vehicle wheel with a non-flexible tire holding rim which is connected to the wheel by a yielding means adapted to support the load.

A further object of the invention is to provide a vehicle wheel with yielding connections between the tire holding rim and the wheel proper which may be independently replaced without removing the rim from the wheel.

With the above, and other objects in view, the invention consists of the vehicle wheel and its parts and combinations as set forth in the claim, and all equivalents thereof.

In the accompanying drawing in which the same reference characters indicate the same parts in the several view: Figure 1 is a side view of a portion of a wheel embodying the improved construction, with parts broken away and other parts shown in section; and, Fig. 2 is a transverse sectional view thereof.

Referring to the drawing the numeral 5 indicates a portion of a wheel and 6 a pair of inner angle iron flanges extending circumferentially around the periphery of the wheel. The flanges are flush with the sides of the wheel rim and are fastened thereto by screws 7. S-shaped flat springs 8 having eyes 9 formed on their ends extend between the flanges and are fastened thereto by bolts 10 which pass through the inner eyes of the springs and through the side flanges and are provided with nuts 11 on their ends. The outer ends of these springs extend between a pair of outer angle iron circumferential flanges 12 and are fastened thereto by bolts 13 which pass through the outer eyes of the springs and through the side flanges of the angle irons. These bolts are also provided with nuts 14. These outer angle iron flanges are riveted to a metal band 15 to hold them in spaced relation and this band in connection with circumferential angle irons 16 riveted thereto forms a non-flexible grooved tire rim 17 which holds the rubber tire 18. The outer eyes of the springs are staggered or offset radially with reference to the eyes of the inner ends of the springs to prevent undue creeping of the tire rim on the wheel.

From the foregoing description it will be seen that the outer rim forms a rigid structure and when put under strain, all of the springs will be put under strain and bear their proportionate load and cushion or absorb the blow. If any of the springs should become broken, they can be easily replaced without separating other parts of the wheel.

What I claim as my invention is:

A vehicle wheel, comprising an inner rim rigidly connected to the spokes of a wheel and provided with peripheral flanges formed of angle irons extending circumferentially around the rim, an outer non-flexible rim extending around the inner rim and formed of pairs of angle irons fastened to an interposed band, the flanges of said angle irons positioned to extend outwardly and inwardly, a tread band placed between the outer flanges, S-shaped springs having eyes formed on their ends which are positioned between the inner flanges of the outer rim and the peripheral flanges of the inner rim, and bolts extending through the said flanges and the eyes of the springs.

In testimony whereof, I affix my signature, in presence of two witnesses.

AUGUST FERDINAND SCHULZ.

Witnesses:
C. H. KEENEY,
LAURA A. KELLEY.